(12) United States Patent
Beaty

(10) Patent No.: US 6,819,233 B2
(45) Date of Patent: Nov. 16, 2004

(54) PRISONER ESCAPE SEAT BELT DETECTION AND ALERT SYSTEM

(76) Inventor: Alan L. Beaty, P.O. Box 579, El Reno, OK (US) 73036

( * ) Notice: Subject to any disclaimer, the term of this patent is extended or adjusted under 35 U.S.C. 154(b) by 0 days.

(21) Appl. No.: 09/928,327

(22) Filed: Aug. 13, 2001

(65) Prior Publication Data

US 2003/0038717 A1 Feb. 27, 2003

(51) Int. Cl.[7] ............................................. B60Q 1/00
(52) U.S. Cl. ................ 340/457.1; 340/438; 340/686.1; 340/687; 180/268; 200/61.58 B; 280/801.1
(58) Field of Search .......................... 340/457.1, 457, 340/459, 438, 47, 686.1, 687; 180/271, 268, 286; 128/869, 878, 876; 297/482, 483, 801.1; 200/61.58 B; 280/801.1

(56) References Cited

U.S. PATENT DOCUMENTS

| | | | | |
|---|---|---|---|---|
| 3,748,639 A | * | 7/1973 | Dobedoe et al. | ......... 340/573.1 |
| 3,875,556 A | * | 4/1975 | Beaird | ......... 340/468 |
| 4,733,633 A | | 3/1988 | Yarnall, Sr. et al. | |
| 4,849,733 A | * | 7/1989 | Conigliaro et al. | ......... 340/457.1 |
| 4,892,014 A | * | 1/1990 | Morell et al. | ......... 340/573.1 |
| 4,933,852 A | * | 6/1990 | Lemelson | ......... 340/438 |
| 4,965,546 A | * | 10/1990 | Chang | ......... 340/457.1 |
| 5,109,199 A | | 4/1992 | Berger | |
| 5,438,311 A | * | 8/1995 | Lane, Sr. | ......... 340/426 |
| 5,438,312 A | * | 8/1995 | Lewis | ......... 340/457 |
| 5,596,312 A | | 1/1997 | Fowler et al. | |
| 5,600,302 A | * | 2/1997 | Lewis | ......... 340/457 |
| 5,627,512 A | | 5/1997 | Bogar | |
| 5,890,329 A | | 4/1999 | Krueger | |
| 5,992,884 A | | 11/1999 | Gillespie et al. | |
| 6,000,249 A | | 12/1999 | Wilber | |
| 6,002,325 A | | 12/1999 | Conaway | |
| 6,059,066 A | | 5/2000 | Lary | |
| 6,079,744 A | | 6/2000 | Husby et al. | |
| 6,102,440 A | | 8/2000 | Bergkessel | |
| 6,142,524 A | * | 11/2000 | Brown et al. | ......... 280/806 |
| 6,203,059 B1 | | 3/2001 | Mazur et al. | |
| 6,239,695 B1 | * | 5/2001 | Okada et al. | ......... 340/457.1 |
| 6,250,700 B1 | | 6/2001 | Traxler | |
| 6,278,358 B1 | * | 8/2001 | Spoto et al. | ......... 340/425.5 |
| 6,300,869 B1 | * | 10/2001 | White et al. | ......... 340/457 |

* cited by examiner

*Primary Examiner*—Davetta W. Goins
(74) *Attorney, Agent, or Firm*—Robert H. Frantz

(57) ABSTRACT

An alarm device which automatically activates a patrol car horn, siren, emergency lights, and/or voice annunciator on a public address loud speaker upon the unauthorized release of a seat belt by a detainee. A relay and control switch are installed in conjunction with the existing seat belt switch circuit underneath a patrol car seat such that they are undetectable by an occupant. After the seat belt is engaged by an officer, the officer may activate a control switch to arm the alarm. Subsequently, if the detainee releases the seat belt, the relay is activated which provides power to the patrol car horn, siren, or lights. This not only warns the officer, who may be outside and far away from the patrol car, but also may startle the would-be escapee. The alarm may be employed in a front passenger seat, as well as in either rear passenger seat.

7 Claims, 2 Drawing Sheets

PRISONER ESCAPE SEAT BELT DETECTION AND ALERT SYSTEM

TECHNICAL FIELD OF THE INVENTION

This invention relates to the field of law enforcement officer safety devices and prisoner restraint systems, and especially to systems to restrain and detect attempted escape of a detainee in a law enforcement vehicle.

CROSS-REFERENCE TO RELATED APPLICATIONS

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

Law enforcement officers such as municipal police officers and highway patrol troopers often detain an individual by first cuffing their hands behind the individual's back, and placing the individual in a seat of the officer's vehicle such as a patrol car.

It is well known in the law enforcement and criminal communities that a prisoner who is handcuffed may easily "slip" his or her hands from behind the back to in front by bringing the knees to a position near the chest and moving the cuffed hands under the posterior and under the soles of the feet. This renders the cuffed hands in front of the individual, which can be a dangerous situation if the detainee uses the cuffs to attack the officer from behind, or uses the hands to obtain a weapon such as the officer's side arm or a gun stored in a patrol car.

When an officer places a handcuffed prisoner into his or her patrol unit, the prisoner's seatbelt will usually be fastened around the prisoner to make such a "slip" move more difficult. However, without some visual supervision, a prisoner may twist his or her upper torso to allow the cuffed hands to reach the seat belt and unbuckle the belt, thereby enabling the prisoner to subsequently "slip" the cuffed hands to his or her front.

As a prisoner is being transported or driven in the back seat of a patrol unit, it is difficult for the officer who is driving to also maintain vigilant visual supervision of the prisoner. To prevent the detainee from quickly releasing the seat belt, slipping the cuffs, and then attacking the driving officer from behind, some patrol units are equipped with a "cage" or physical separator between the front and back seats of the vehicle. This effectively contains the prisoner until the officer can safely stop the vehicle and regain control of the detainee.

In some situations, an individual is handcuffed and placed in the patrol unit while the officer conducts a search of the individual's vehicle, interviews witnesses, or investigates a crime scene. During this time, the officer often loses visual contact with the detainee, providing an opportunity for attempted escape in some situations.

Many patrol units are not equipped with a "cage"or separator between the front and rear seats. Some agencies decide to forgo the several-hundred dollar cost of the cages for budgetary reasons. Others decide not to install cages due to the space restrictions is places on the rear-seat occupants, and interference with front seat travel to adjust for taller officer drivers.

Officers who operate patrol units which are unequipped with a cage typically elect to place handcuffed detainees in the front passenger seat, both while transporting the detainee, and while outside the vehicle conducting searches, interviews and investigations. This is the best available situation, wherein the officer can maintain a visual observation of the detainee the greatest amount of time while in custody, especially while driving. However, while the officer is outside the patrol unit, it is still possible for the detainee to release the seat belt, slip the cuffs, and attempt escape. These escape attempts often lead to the officer's vehicle being used to drive away or attempt to "run over" the officer. In many situations, the officer's shotgun and/or automatic weapon may be stored within the vehicle passenger cabin, producing a potentially deadly situation should the detainee obtain a weapon and use it against the arresting officer.

As such, officers face special danger while working alone with detainees "buckled in" the front passenger seat, such as while a highway patrol officer performs a search of a stopped vehicle.

Most patrol cars are equipped with seat belt safety sensors which, when a seat is occupied, give an indication such as a chime and/or dashboard light to indicate a seat belt is unfastened. These are typically the same sensors employed in civilian vehicles, and are not especially adapted to law enforcement use. FIG. 1 illustrates the essential components of these seat belts, including a buckle end (1) and a receiver end (2). The buckle end (1) typically joins a shoulder strap (4) and a lap strap (5), and provides a tongue (3) for insertion into the receiver end (2).

The receiver end (2) typically includes a receiver housing having an integral electrical switch (8) with two wires (6, 7) woven into a length (9) of belt material such as nylon strap. The electrical switch (8) is usually of a "normally closed" (N.C.) type, which when engaged by an inserted buckle tongue (3), breaks the electrical conductivity between the two wires (6, 7). One of the wires (6) is usually interconnected to a chime, buzzer, dashboard indicator, or computer control module, while the other wire (7) is usually connected to chassis ground (10). As such, a buzzer, chime or dashboard indicator is activated when the buckle tongue (3) is not inserted into the receiver end (2), causing a complete electrical path from the chime or control wire (6) through the receiver sensor switch (8) to ground (10). When the buckle tongue (3) is inserted into the receiver, the sensor switch (8) is engaged, and the electrical path from the control wire (6) to ground (10) is broken.

Further, many of these safety indicators are equipped with a timer device which disables the circuit from activating the indicator a certain amount of time after the vehicle is started. This allows a driver to drive the car while unbuckled without enduring an incessant buzzer, chime or dashboard indicator.

These typical indicators are not observable from outside the vehicle, typically, and especially not if the doors of the vehicle are closed. For example, while an officer searches a stopped vehicle with a detainee buckled into the patrol car passenger seat, if the detainee releases the belt buckle, the officer may be too far from the patrol car to hear a chime or buzzer inside the patrol car. Additionally, since this is a well-known operation of cars, the escaping detainee is not alarmed or shocked at the occurrence of the chime or buzzer, and is not dissuaded from continuing the escape attempt. In most vehicles, if the patrol car has been running for certain amount of time, the indicator is automatically disabled. This can lead to escape of the detainee, theft of the patrol car, and assault on the arresting officer.

There are some alarm and alert devices in the art which provide an indication of an unbuckled seat belt. Many of these, however, are either expensive to build and install, rely upon batteries for operation, modify the appearance of the seat belt, or do not provide an alert mechanism which would be sufficient to alert an officer outside and some distance from the vehicle. If an alert is expensive, it is unlikely that a law enforcement agency will purchase it, similar to the situation with patrol car cages. If it relies upon batteries, the unit may not function when the batteries are weak. If the appearance of the seat belt is altered, the detainee may tamper with the seat belt to disable the device. And, if the alert is not loud enough or bright enough, an officer who is outside the patrol car and perhaps 10 to 20 yards away will not be adequately warned of the escape attempt. While the devices available in the art serve other purposes, such as alerting a mother of a child who has released a seat belt, they are not sufficient for use as an escape detection and warning system for law enforcement.

Therefore, there is a need in the art for a device which alerts a law enforcement officer of an attempted escape through the unauthorized release of a patrol car seat belt. Further, there is a need in the art for this system to be an expensive to build and install. Additionally, there is a need in the art for this system to be indistinguishable from a standard seat belt system such that a detainee is not alerted to its existence. Finally, there is a need in the art for this system to provide an alert mechanism sufficient to warn an officer who is outside a patrol car and preferably sufficient to startle the detainee who is attempting to escape.

SUMMARY OF THE INVENTION

The present invention provides a low-cost and easily installed mechanism which, when enabled by an officer, automatically activates a patrol car horn, siren, emergency lights, and/or voice annunciator on a public address loud speaker. A relay and control switch are installed in conjunction with the existing seat belt switch circuit underneath a patrol car seat such that they are undetectable by an occupant. After the seat belt is engaged by an officer, the officer may activate a control switch to arm the alarm. Subsequently, if the occupant or detainee releases the seat belt, the relay is activated which provides power to the patrol car horn, siren, or lights. This not only warns the officer, who may be outside and far away from the patrol car, but also may startle the would-be escapee. The present invention may be employed in a front passenger seat, as well as in either rear passenger seat.

BRIEF DESCRIPTION OF THE DRAWINGS

The figures presented herein when taken in conjunction with the disclosure form a complete description of the invention.

DETAILED DESCRIPTION OF THE INVENTION

The present invention is preferably realized using inexpensive automotive relays, switches, wiring and connectors. No batteries, microprocessors, or expensive devices are needed in the preferred embodiment. Further, the preferred embodiment is installed inconspicuously underneath the seat of a patrol car.

Figure 1:
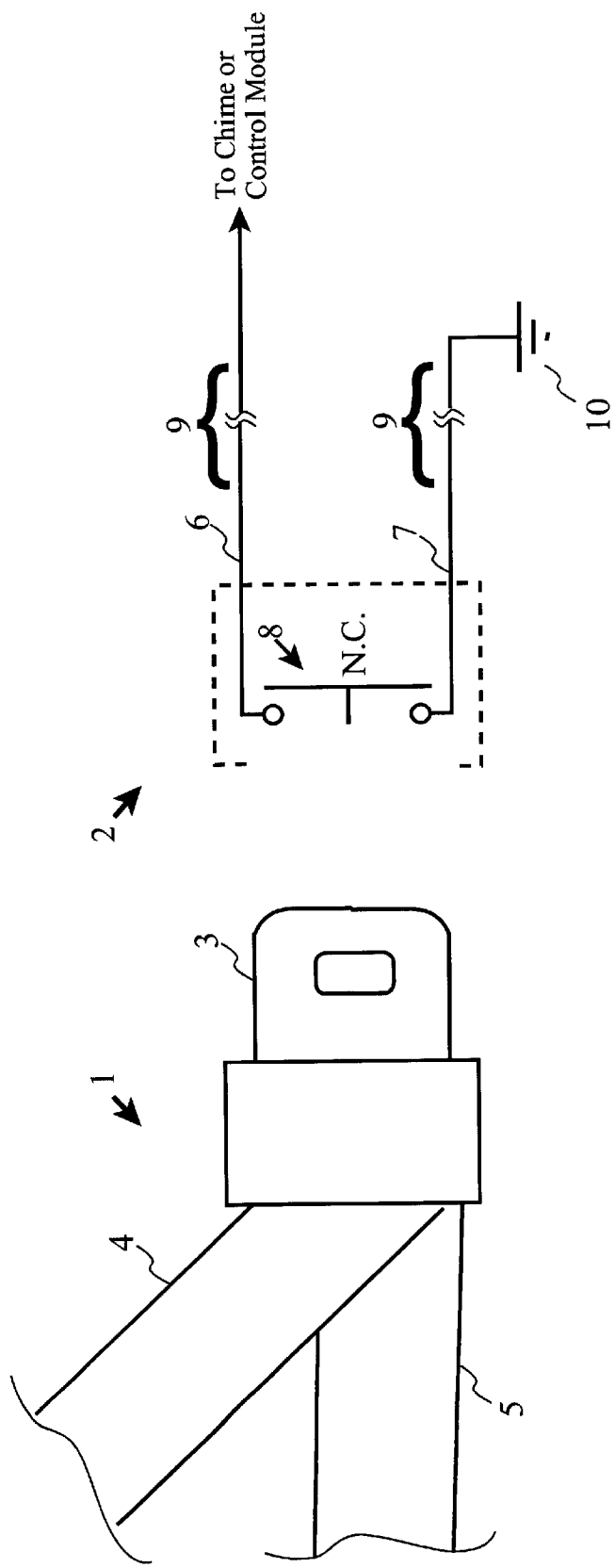
FIG. 1 illustrates the arrangement of seat belt sensors employed in ordinary passenger vehicles.
Figure 2:
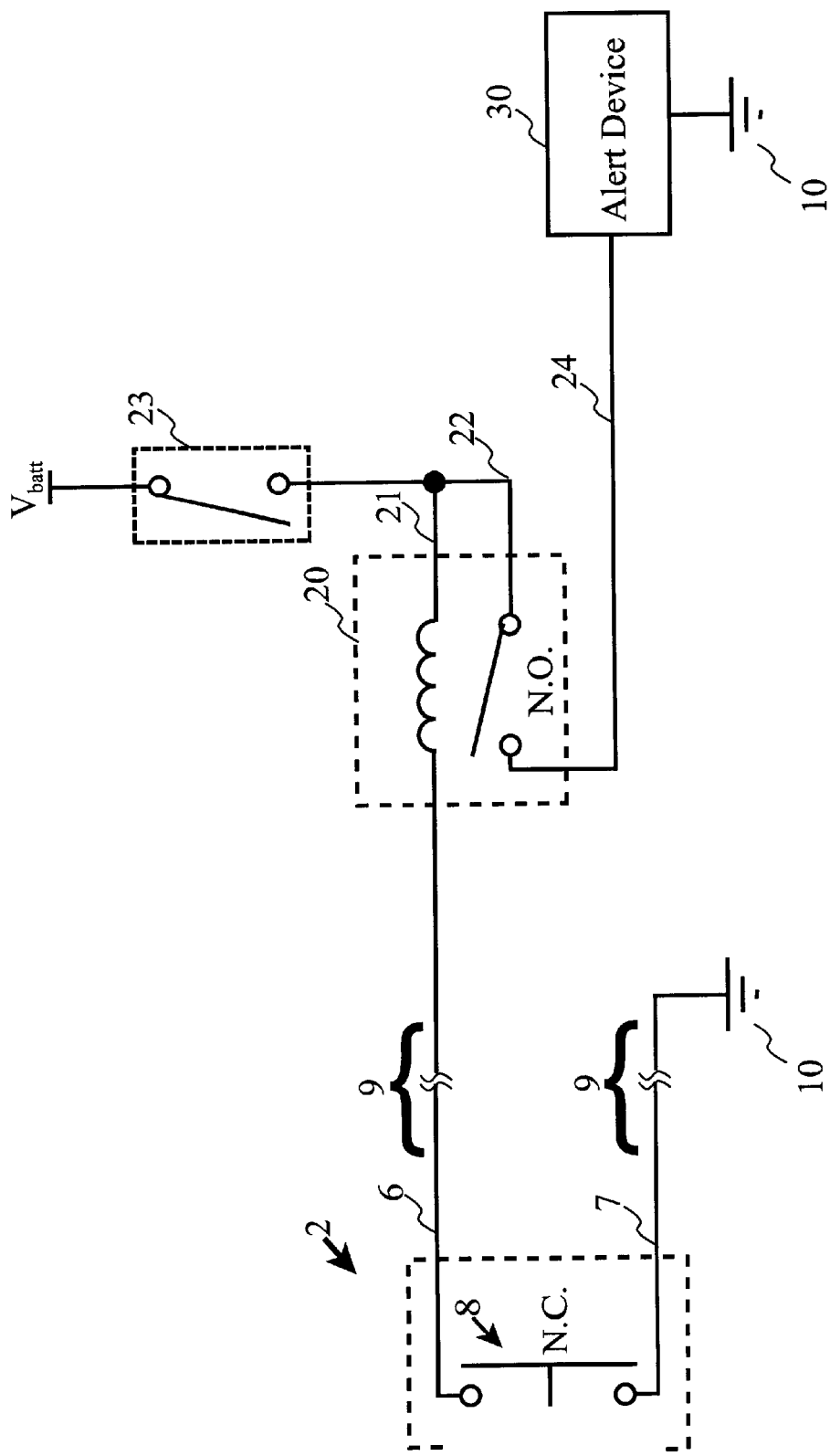
FIG. 2 shows the circuit diagram of the preferred embodiment of the invention.

Turning to FIG. 2, the circuit diagram of the preferred embodiment is shown. The receiver end (2) of seat belt is used without modification from the standard manufacturer's design. This allows the invention to be easily installed in a variety of vehicle makes and models without substantial modifications. The control wire (6) is disconnected from its normal connection to the car chime or dashboard indicator, and is re-connected to one side of control coil of a suitable 12 volt relay (20). Typically, this control wire is available at a connector underneath the passenger seat. According to the preferred embodiment, a matching connector is provided in the circuit of FIG. 2 in order to facilitate quick and easy installation. The ground wire (7) to the receiver end (2) is left connected to chassis ground.

The other side of the control coil of the relay (20) is connected to the car battery voltage source through a control switch (23). When the control switch (23) is left open, the alarm is disabled. When the control switch (23) is closed by the officer or operator, the alarm is enabled by providing an electrical path from the car battery to the control wire (6) of the receiver end (2) of the seat belt. The control switch (23) is preferably mounted in an inconspicuous location, such as a foot switch underneath the carpet in the driver's floorboard area.

One pole of the relay switch (20) is also connected to the battery source, preferably through the same control switch (23). The other pole of the relay switch (20) disconnected to the selected alerting device on the patrol car, such as the car horn, emergency lights, or a voice-annunciator through a public address loudspeaker.

The operation of the device is as follows:
(A) An officer places the detainee in a passenger seat equipped with the alarm device;
(B) the officer then closes the control switch (23) to enable the seat belt alarm;
(C) if the detainee releases the seat belt, the sensor switch (8) in the receiver end (2) of the seat belt closes completing an electrical path from the vehicle batteries source through the control switch (23) through the coil of the relay (20) through the sensor switch (8) of the receiver end (2) to chassis ground (10);
(D) the current flow in the control coil of the relay (20) causes the normally open (N.O.) relay switch to close, which completes an electrical path from the battery source through the control switch (23) to alert wire (24) to engage the alerting device (30) such as the vehicle horn or siren.

Many suitable connectors, relays and switches are available for 12 volt applications in vehicles, and it is within the skill of those skilled in the art to select particular devices and components for use within specific makes and models of vehicles. It will also be recognized by those skilled in the art that certain details of the preferred embodiment have been disclosed, but that certain modifications, substitutions and alterations may be made without departing from the spirit and scope of the invention. Therefore, this scope of the present invention should be determined by the following claims.

What is claimed is:

1. A detainee escape detection device for use in a law enforcement vehicle, said vehicle having a driver's seat, said device comprising:

at least one passenger seat having a passenger seat belt, said passenger seat belt having an integral sensor switch which provides an electrical path from a control wire to vehicle chassis ground when and only when said seat beat is unbuckled;

a relay having an actuating coil with a first coil terminal and a second coil terminal, a normally open switch which is closed by energizing said actuating coil, said switch having a first switch pole and a second switch pole;

a first electrical connection between said passenger seat belt sensor switch and said first coil terminal;

a second electrical connection between a vehicle battery voltage source and said second coil terminal;

a third electrical connection between a vehicle battery voltage source and said first switch pole;

an external audible alerting means selected from the group of a horn, a siren, and a voice annunciator with a public address loudspeaker; and a fourth electrical connection between said vehicle alert means and said second switch pole such that when said passenger seat belt is unbuckled, an electrical path is immediately provided from the vehicle battery voltage source through said actuating coil to vehicle chassis ground, thereby actuating the relay switch to a closed position and providing an electrical path from the vehicle battery voltage source to said external audible alert means such that said alert means is activated immediately.

2. The device as set forth in claim 1 further comprising a driver-operable control switch disposed in between said vehicle battery voltage source and said second coil terminal such that opening of the control switch breaks the possible electrical path through the relay coil thereby disabling the device, said control switch being physically located and concealed within reach of said driver seat.

3. The device as set forth in claim 1 further comprising standard electrical connectors on said first coil terminal, second coil terminal, first relay switch pole, and second relay switch pole such that the device is readily installable on a pre-existing wiring harness of a vehicle, thereby reducing the cost of manufacturing and difficulty of installation of the device.

4. The device as set forth in claim 2 further comprising standard electrical connectors on said first coil terminal, operator control switch, first relay switch pole, and second relay switch pole such that the device is readily installable on a pre-existing wiring harness of a vehicle, thereby reducing the cost of manufacturing and difficulty of installation of the device.

5. A method of providing an escape alarm in a law enforcement vehicle, said law enforcement vehicle having a driver's seat, said method comprising the steps of:

providing at least one passenger seat with a passenger seat belt, said passenger seat belt having an integral sensor switch which provides an electrical path from a control wire to vehicle chassis ground when and only when said seat beat is unbuckled;

providing an external audible alerting means selected from the group of a horn, a siren, and a voice annunciator coupled to a public address loudspeaker;

providing a relay control means for directing an electrical signal to said vehicle alert means communicative with said passenger seat belt sensor; and directing an electrical signal to activate said external audible alert means immediately responsive to detection of an unbuckled status of said seat belt via said sensor such that said alert means is immediately activated.

6. The method as set forth in claim 5 further comprising the step of installing said relay control means under said passenger seat.

7. The method as set forth in claim 5 further comprising the step of providing a driver-operable disable switch which disables the step of directing an electrical signal to activate the external audible alert means, said disable switch being disposed and concealed within reach of said driver seat.

* * * * *